(12) United States Patent
Rice

(10) Patent No.: US 6,703,579 B1
(45) Date of Patent: Mar. 9, 2004

(54) ARC CONTROL FOR SPRAYING

(75) Inventor: Edwin E. Rice, Ann Arbor, MI (US)

(73) Assignee: Cinetic Automation Corporation, Farmington Hills, MI (US)

( * ) Notice: Subject to any disclaimer, the term of this patent is extended or adjusted under 35 U.S.C. 154(b) by 0 days.

(21) Appl. No.: 10/261,285

(22) Filed: Sep. 30, 2002

(51) Int. Cl.[7] .............................................. B23K 10/00
(52) U.S. Cl. ............................ 219/121.47; 219/76.16; 219/121.54; 219/121.56; 427/449
(58) Field of Search .......................... 219/130.02, 76.16, 219/76.15, 121.47, 121.39, 121.45, 121.56, 121.54; 427/446, 449

(56) References Cited

U.S. PATENT DOCUMENTS

| 4,156,125 A | * | 5/1979 | Brown ................. 219/121.54 |
| 5,019,686 A | | 5/1991 | Marantz |
| 5,245,153 A | | 9/1993 | Singer et al. |
| 5,296,667 A | | 3/1994 | Marantz et al. |
| 5,442,153 A | | 8/1995 | Marantz et al. |
| 5,468,295 A | | 11/1995 | Marantz et al. |
| 5,482,734 A | * | 1/1996 | Herwig et al. ........... 219/76.16 |
| 5,707,693 A | | 1/1998 | Vliet et al. |
| 5,714,205 A | | 2/1998 | Marantz et al. |
| 5,796,064 A | | 8/1998 | Rice et al. |
| 5,938,944 A | | 8/1999 | Baughman et al. |
| 6,028,287 A | * | 2/2000 | Passage et al. ........ 219/121.56 |

* cited by examiner

Primary Examiner—Mark Paschall
(74) Attorney, Agent, or Firm—Harness, Dickey & Pierce, P.L.C.

(57) ABSTRACT

A thermal spraying system includes thermal spray material, an electrical energy thermal spraying device atomizing and spraying the thermal spray material, a power supply supplying electrical power to the spraying device, a sensor monitoring a power characteristic of the supplied electrical power, and a feed rate control module adjusting a feed rate of the thermal spray material based on the monitored power characteristic.

41 Claims, 7 Drawing Sheets

ARC CONTROL FOR SPRAYING

FIELD OF THE INVENTION

The present invention generally relates to arc control for spraying and more specifically relates to electric arc control in a thermal spraying process wherein an electrode is a consumable spray material.

BACKGROUND OF THE INVENTION

Plasma metal spraying processes using wire feed stock are generally well known, and are discussed at length in U.S. Pat. No. 5,245,153 entitled Depositing Metal Onto a Surface which issued to Singer et al.; U.S. Pat. No. 5,707,693 entitled Method and Apparatus for Thermal Spraying Cylindrical Bores which issued to Vliet et al.; U.S. Pat. No. 5,796,064 entitled Method and Apparatus for Dual Coat Thermal Spraying Cylindrical Bores which issued to Rice et al.; and U.S. Pat. No. 5,938,944 entitled Plasma Transferred Wire Arc Thermal Spray Apparatus and Method which issued to Baughman et al. All of these patents are herein incorporated by reference. The primary process control objective in a thermal spray process is uniform melt rate of the wire feed stock. The melt rate is a function of: wire feed rate; supply current at the plasma gun; voltage potential between the wire feed stock and the gun electrode; and other factors such as gun design, gas flow, etc., that are generally presumed constant throughout the following disclosure. A secondary concern is wire "burn back" that affects the melt rate and can damage the plasma gun due to double arcing that can occur when the consumable electrode (feed wire) burns back too far due to a fault in feeding the wire. With current practices, burn back is generally caused by a slower wire feed rate which may be due to drag on the feed wire and/or slippage of the drive rollers.

Current practices use a constant wire feed rate once the process is tuned along with a constant current supply. This method of controlling the arc in a thermal spray process is taught in U.S. Pat. No. 5,296,667 entitled High Velocity Electric-Arc Spray Apparatus and Method of Forming Materials which issued to Marantz et al. and is herein incorporated by reference. This method, however, requires a more expensive type of power supply.

Marantz et al. also teaches a method for preventing damage to a spray gun due to burn back that operates by sensing a rise in voltage produced by a constant current power supply. Burn back increases the plasma arc length, which, in a system with a constant current supply, results in a higher voltage across the electrodes. A disadvantage of a constant current system is by definition a variable voltage system that increases voltage if current starts to fall or decreases voltage if current starts to rise. As current remains essentially constant, the rise and fall of voltage corresponds to a rise and fall in heat energy in the arc. In the case of burn back, the arc increases in length which corresponds to an increase in resistance (R). To compensate, voltage rises to maintain a constant current level, which results in more burn back. The opposite effect occurs with constant voltage control. The method of Marantz et al. includes interrupting the power supply upon excessive voltage rise before damage to the gun can occur. Thus, a mechanism is used for sensing "burn back" that uses a voltage sensing circuit in line with a power supply to the thermal spray gun and turns off power to the system if burn back occurs. Hence, the method does not succeed in reducing occurrence of burn back by compensating for onset of a burn back condition, but merely prevents damage to the spray gun at a cost of shutting down the thermal spraying process an d interrupting production. Also, the method fails to account for variations in power characteristics that may result, for example, from power surges and/or faulty electrical contacts in the system. Further, where a change in thermal energy is detected due to an excessive rise in applied voltage, the method teaches turning off power to the system in response. Hence, the method does not have adaptive capability to maintain even deposition of thermal spray material on a workpiece despite changes in thermal energy, but merely prevents uneven deposition of thermal spraying material on a workpiece in some conditions at a cost of shutting down the thermal spraying process in other conditions.

The need remains, therefore, for an adaptive system and method of arc control in a thermal spraying system that decreases occurrence of burn back conditions while maintaining even deposition of spray material on a workpiece despite variations in power supplied to the thermal spray gun. The present invention supplies such a solution.

SUMMARY OF THE INVENTION

In accordance with the present invention, a thermal spraying system includes consumable electrode thermal spray material, an electrical energy thermal spraying device atomizing and spraying the thermal spray material, a power supply supplying electrical power to the spraying device, a sensor monitoring a power characteristic of the supplied electrical power, and a feed rate control module adjusting a feed rate of the thermal spray material based on the monitored power characteristic.

In another aspect, a thermal spraying system includes consumable electrode thermal spray material, an electrical energy thermal spraying device atomizing and spraying the thermal spray material, a workpiece receiving atomized and sprayed thermal spray material on a surface of the workpiece, a power supply supplying electrical power to the spraying device, a sensor monitoring a power characteristic of the supplied electrical power, and a movement rate control module adjusting a rate of movement of the spraying device relative to the workpiece based on the monitored power characteristic.

In another aspect, the present invention is a thermal spraying system including consumable electrode thermal spray material, an electrical energy thermal spraying device atomizing and spraying the thermal spray material, a constant voltage DC power supply operable to supply electrical power to the spraying device, a current sensor operable to monitor an electrical current level of the supplied electrical power, and a power interruption module operable to shut off electrical power to the spraying device if the sensed electrical current level drops below a predetermined threshold in order to reduce damage to the spraying device that occurs in a burn back condition.

In another aspect, the present invention is a thermal spraying system including consumable electrode thermal spray material, an electrical energy thermal spraying device atomizing and spraying the, thermal spray material, a power supply supplying electrical power to the spraying device, a sensor monitoring a power characteristic of the supplied electrical power, and a feed rate control module adjusting a feed rate of the thermal spray material based on the sensed power characteristic in order to reduce damage to the spraying device that occurs in a burn back condition without shutting down said system.

In another aspect, the present invention is an arc control system for use with a spraying device atomizing and spraying consumable electrode thermal spray material. The system includes an input module receptive of power characteristic information relating to a power characteristic of electrical power supplied to the spraying device, and a feed rate control module generating feed rate control information based on the power characteristic information, wherein the feed rate control information is calculated to adjust a feed rate of the thermal spray material.

In another aspect, the present invention is an arc control system for use with a spraying device atomizing and spraying thermal spray material. The system includes an input module receptive of power characteristic information relating to a power characteristic of electrical power supplied to the spraying device, and a movement rate control module generating movement rate control information based on the power characteristic information, wherein the movement rate control information is calculated to adjust a rate of movement of the spraying device relative to a workpiece, thereby improving evenness of deposition of atomized and sprayed thermal spray material on a surface of the workpiece.

In another aspect, the present invention is a method of performing arc control for use with a spraying device atomizing and spraying consumable electrode thermal spray material. The method includes receiving power characteristic information relating to a power characteristic of electrical power supplied to the spraying device, generating feed rate control information based on the power characteristic information, wherein the feed rate control information is calculated to adjust a feed rate of the thermal spray material, and adjusting the feed rate based on the feed rate control information.

In another aspect, the present invention is a method of controlling a spraying device atomizing and spraying thermal spray material. The method includes receiving power characteristic information relating to a power characteristic of electrical power supplied to the spraying device, generating movement rate control information based on the power characteristic information, wherein the movement rate control information is calculated to adjust a rate of movement of the spraying device relative to a workpiece in order to improve evenness of deposition of atomized and sprayed thermal spray material on a surface of the workpiece, and adjusting the rate of movement of the spraying device relative to said workpiece based on the rate control information.

The arc control system of the present invention is advantageous over conventional devices in that it can control the current at a constant level without requiring a constant current DC power supply. This capability is particularly advantageous because a constant current DC power supply is considerably more expensive than a substantially constant voltage DC power supply. Especially for multiple thermal spray gun applications where the use of a constant current DC power supply necessitates a separate power supply to each thermal spray gun, a substantially constant voltage power supply allows use of only one power supply to all thermal spray guns. In many applications, plant line voltage regulation is satisfactory for voltage control. An additional advantage of the arc control system of the present invention is an ability to include a mechanism that prevents damage to a thermal spray gun due to a burn back condition without requiring a constant current DC power supply. A further advantage of the present invention is that it can sense the onset of a burn back condition that could lead to damage of the thermal spray gun, and act to prevent the burn back condition without shutting down the thermal spray process by increasing the feed rate of the consumable electrode spray material. A still further advantage of the arc control system of the present invention is that it can monitor thermal energy as a function of supplied power characteristics and seek to maintain a balance between thermal energy and feed rate by varying feed rate of the consumable electrode spray material. An even further advantage of the present invention is that it can vary a traverse rate of the thermal spray gun relative to a workpiece in response to a monitored change in thermal energy in as correlated with fluctuations in supply voltage and/or current. Thus, the present invention can improve uniformity of deposition of thermal spray material on a workpiece. Additional advantages and features of the present invention will become apparent from the following detailed description, claims, and accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
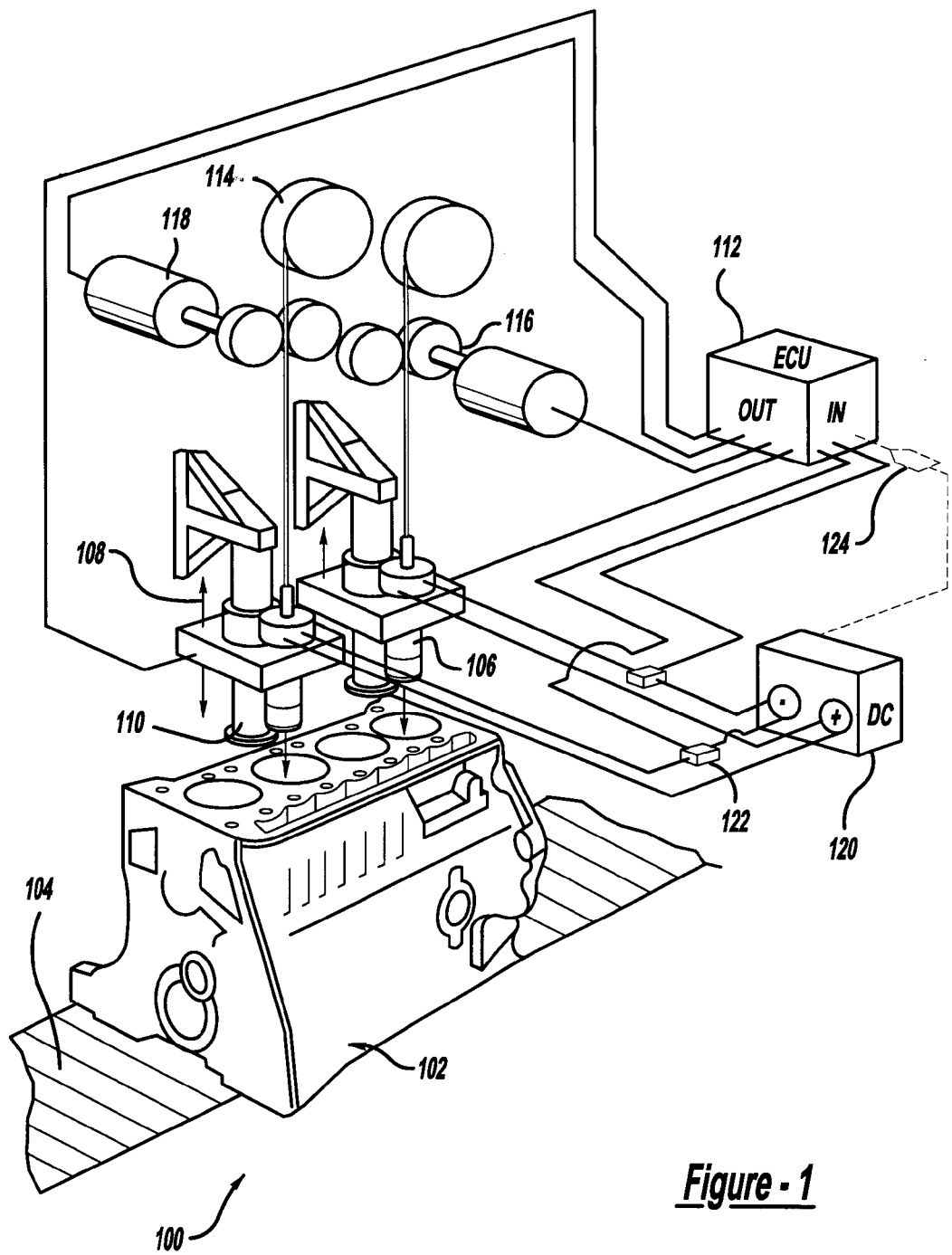
FIG. 1 is a partially diagrammatic, perspective view showing the preferred embodiment of a thermal spraying system employing an arc control system according to the present invention.

Referring to FIG. 1, the preferred embodiment of a thermal spraying system 100 employing an arc control system according to the present invention has an automotive power train workpiece 102, such as an engine block having piston cylinder bores, situated on a conveyor 104 and positioned beneath one or more spray guns 106. Each spray gun 106 operably moves relative to a position of workpiece 102 in an axial direction 108 by a hydraulic cylinder assembly 110, each spray gun is further operable to rotate concentric within a cylinder bore according to U.S. Pat. No. 5,296,667, herein incorporated by reference as put forth above. The axial and/or rotational movement rate(s) of each spray gun 106 is controlled by an electrical control unit (ECU) 112, such as a micro-processor, so as to achieve an even deposition of spray material on the inner surfaces of the bores in workpiece 102. Each spray gun 106 receives thermal spray material 114 in the form of wire feed stock that is fed by drive rollers 116. In accordance with the present invention, drive rollers 116 are driven by a servo motor 118 at a feed rate controlled by ECU 112. A DC power supply 120 supplies power to each spray gun 106, and ECU 112 adjusts the feed rate of thermal spray material 114 based on power characteristic information obtained via power characteristic sensor 122. According to the present invention, functionality of power characteristic sensor 122 varies according to a type of DC power supply 120, and this variability is further discussed below with reference to FIGS. 2 and 3. The power characteristic sensor 122 of the preferred embodiment of FIG. 1, however, corresponds to a current sensor for monitoring current of the preferred constant voltage DC power supply 120. Further according to the preferred embodiment, constant voltage DC power supply 120 provides power to each spray gun 106, while ECU 112 controls feed rate and movement rate of each spray gun 106 individually according to sensed current supplied to each spray gun. Also, a power characteristic reference signal 124 (FIG. 1) may optionally be employed that proceeds from DC power supply 120 to ECU 112. According to the present invention, the nature of optional reference signal 124 also varies according to a type of DC power supply 120, and this variability is further discussed below with reference to FIGS. 2 and 3. According to the preferred embodiment of FIG. 1, however, feed signal 124 corresponds to a voltage reference signal.

Figure 2:
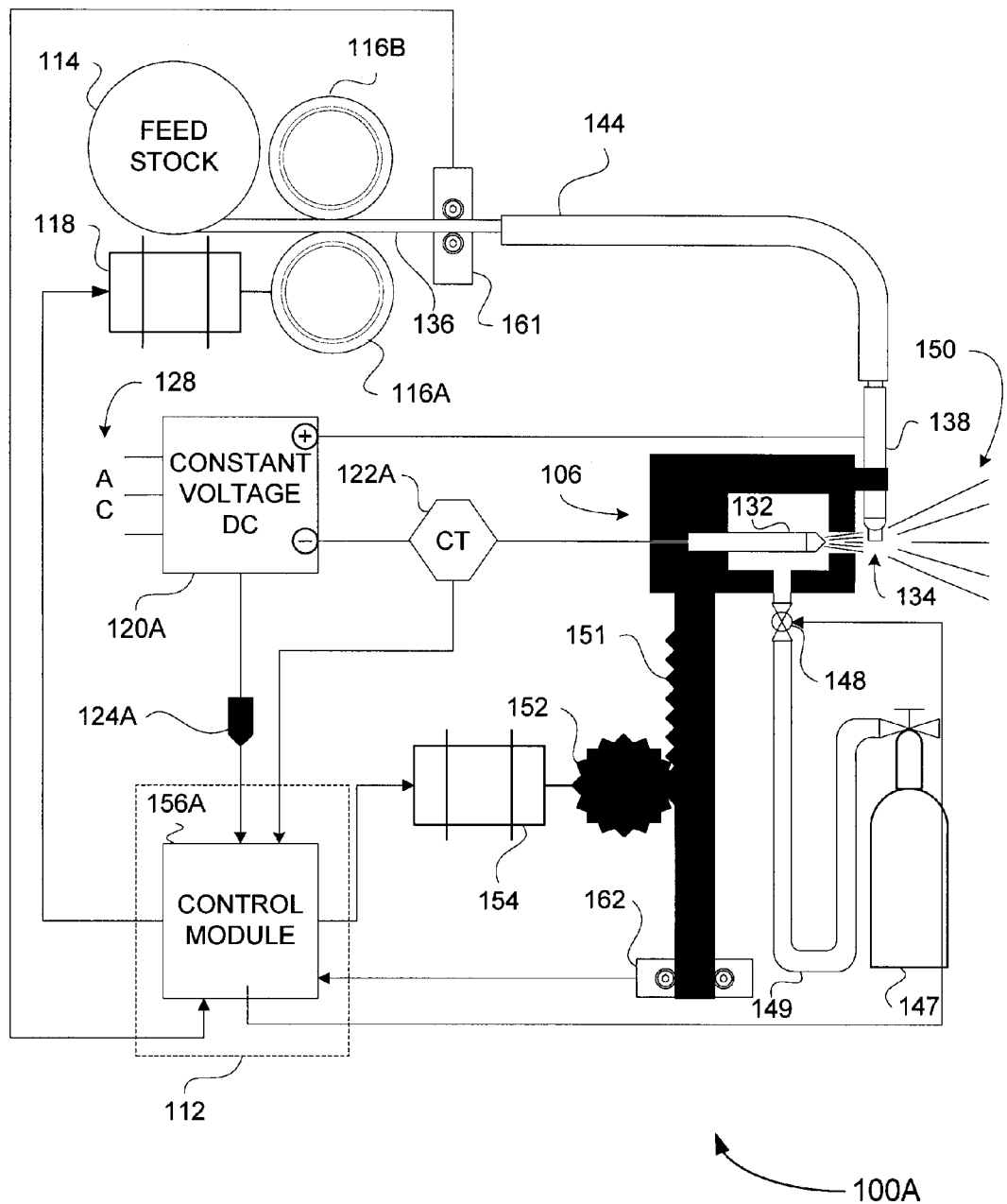
FIG. 2 is a block diagram showing the first preferred sub-embodiment of a thermal spraying system employing an arc control system according to the present invention.

Referring to FIG. 2, a block diagram of a first sub-embodiment of a thermal spraying system 100A according to the present invention has a constant voltage DC power supply 120A that maintains a constant voltage according to the voltage of electric power supplied by a three-phase AC power supply 128. Thermal spraying system 100A further has a thermal spray gun 106 that includes a non-consumable cathode 132 and a consumable anode 134 formed of feed wire 136 electrified via an electrical contact 138. Feed wire 136 of thermal spraying system 100A corresponds to consumable spray material of which spray gun 106 is receptive. Specifically, wire feed stock 114 is fed by drive rollers 116A and 116B through flexible feed wire guide 144, at a rate primarily determined by operation of wire feed servo motor 118 to spray gun 106 where it is received, electrified, and further guided into a predetermined position proximate to cathode 132 via electrical contact 138. Spray gun 106 also receives a generally inert gas from inert gas supply 147. Specifically, inert gas flows from inert gas supply 147 to inline regulator 148 of spray gun 106 via flexible tubing 149. The inert gas is directed as an atomizing gas through an arc formed between cathode 132 and anode 134 to produce metal plasma spray 150. Spray gun 106 further has a rack member 151 driven by a pinion gear 152 to affect a traversal of a bore of workpiece 102 (see FIG. 1) by spray gun 106 at a rate primarily determined by operation of a spray gun traversal servo motor 154 such that the consumable spray material is deposited on a surface of the bore of workpiece 102 (see FIG. 1) in a substantially uniform manner.

Although not shown in FIG. 1, the a rotational traversal by spray gun(s) 106 is required for coating the inner surface of the bore of workpiece 102. In alternative embodiments, the spray gun(s) 106 may physically rotate in whole or in part to affect the rotational traversal. A servo motor controlled by ECU 112 may be employed to drive the rotational motion(s) of the spray gun(s) 106, and slipping contacts may be employed to maintain power supply to the rotating portion(s) of the spray gun(s) 106. An inert gas supply to a spray gun 106 may also be caused to rotate as needed.

In accordance with the present invention, thermal spraying system 100A further incorporates a control module 156A of ECU 112 for affecting operation of wire feed servo motor 118 and spray gun traversal servo motor 154. Control module 156A receives power characteristic information in the form of a voltage feed signal 124A from DC power supply 120A and a current reading from current sensor 122A, which is preferably a Hall sensor disposed in line with the electric circuit formed between DC power supply 120A, cathode 132, and anode 134. Control module 156 further receives wire feed rate information from wire feed rate sensor 161 and spray gun traverse rate information from spray gun traverse rate sensor 162, which are preferably tachometers.

With the constant voltage DC power supply of thermal spraying system 100A, the current is an inverse function of arc length, but a direct function of wire feed rate. Control module 156A servo controls wire feed servo motor 118 as a function of the power supply current to maintain current within close limits and thereby affect a substantially constant current. Thus, the feed rate is increased if the current decreases and vice versa. Additionally, output voltage can be proportional to and regulated by the plant supply voltage in many applications, and supply voltage may vary unexpectedly with the typical wane and surge of supplied power. Thus, control module 156A may optionally take variations in voltage into account when affecting adjustment of the wire feed rate. This functionality stems from the fact that feed wire melt rate and spray deposition rate is a function of thermal energy in the plasma arc and thermal energy is a function of current and voltage. For example, if the DC voltage is on the high side, the wire feed could be slowed momentarily to increase the arc length (reducing the current level) and thereby optimize the thermal energy level for a uniform feed wire melt rate. Preferably, however, control module 156A controls the wire feed rate and spray gun traverse rate as a function of thermal energy, and thereby ensures a more even deposition of thermal spray material on a workpiece. For example, a rise in thermal energy may trigger a proportional increase in wire feed rate and traverse rate, whereas a decrease in thermal energy may trigger a proportional decrease in wire feed rate and traverse rate.

The current information may also be used by control module 156A to signal system shut down if the current changes to a level outside given limits. For example, loss of continuity between electrical contact 138 and the feed wire causes a drop in current that may invoke a response to shut down the system and signal a maintenance repair condition. Similarly, if current rises above a given threshold despite efforts of control module 156 to maintain a substantially constant current, the same response could be invoked. By way of another example, drive rollers may become ineffective over time, and feed guides can become jammed. Thus, burn back conditions may not always be preventable, but may still be detected by monitoring a drop in current below a given threshold where a constant voltage DC power supply is utilized, and this drop can trigger a shutdown before significant damage can occur. Notably, a comparison between wire feed servo motor command and a feed rate signal from sensor 161 can be used to detect onset of a wire feed/sensing problem.

Figure 3:
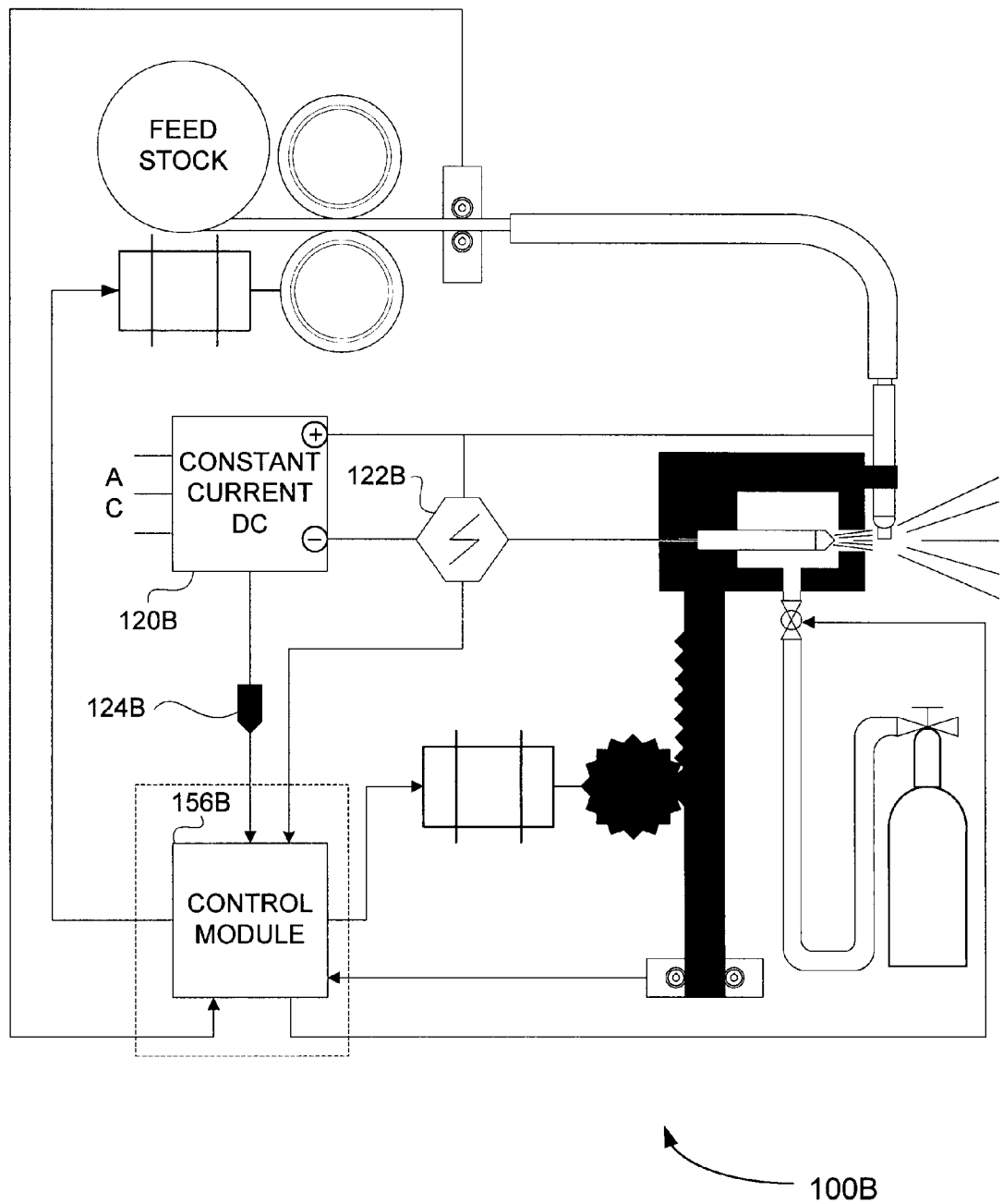
FIG. 3 is a block diagram showing the second preferred sub-embodiment of a thermal spraying system employing an arc control system according to the present invention.

FIG. 3 illustrates a second preferred sub-embodiment of a thermal spraying system 100B has, except where otherwise specified, the same features as thermal spraying system 100A (see FIG. 2). Thermal spraying system 100B, however, has a constant current DC power supply 120B instead of a constant voltage DC power supply 120A (see FIG. 2). Further, thermal spraying system 100B has a voltage sensor 122B in place of current sensor 122A (see FIG. 2). Complementarily, control module 156B receives power characteristic information in the form of a current feed signal 124B from constant current DC power supply 120B and a voltage reading from voltage sensor 122B. Accordingly, operation of control module 156B differs from that of control module 156A (see FIG. 2) to accommodate for the fact that use of a constant current power supply 120B renders voltage, rather than current, a function of arc length. Thus, if voltage increases due to increase in arc length resulting from onset of a burn back condition, this increase may be correlated with an increase in thermal energy, such that control module 156B increases wire feed rate and/or spray gun traverse rate. A decrease in voltage further results in a decrease in wire feed rate and deposition rate, resulting in module 156B reducing traverse rate. Also, thermal energy can be monitored by means of a reference signal as previously discussed. Overall, the precise functionality of the arc control system depends upon the thermal spraying system with which it is implemented, and further depends upon the method of operation for the thermal spraying system, the particular application of the thermal spraying system, and decisions of operators of the thermal spraying system respective to the particular application.

Figure 4:
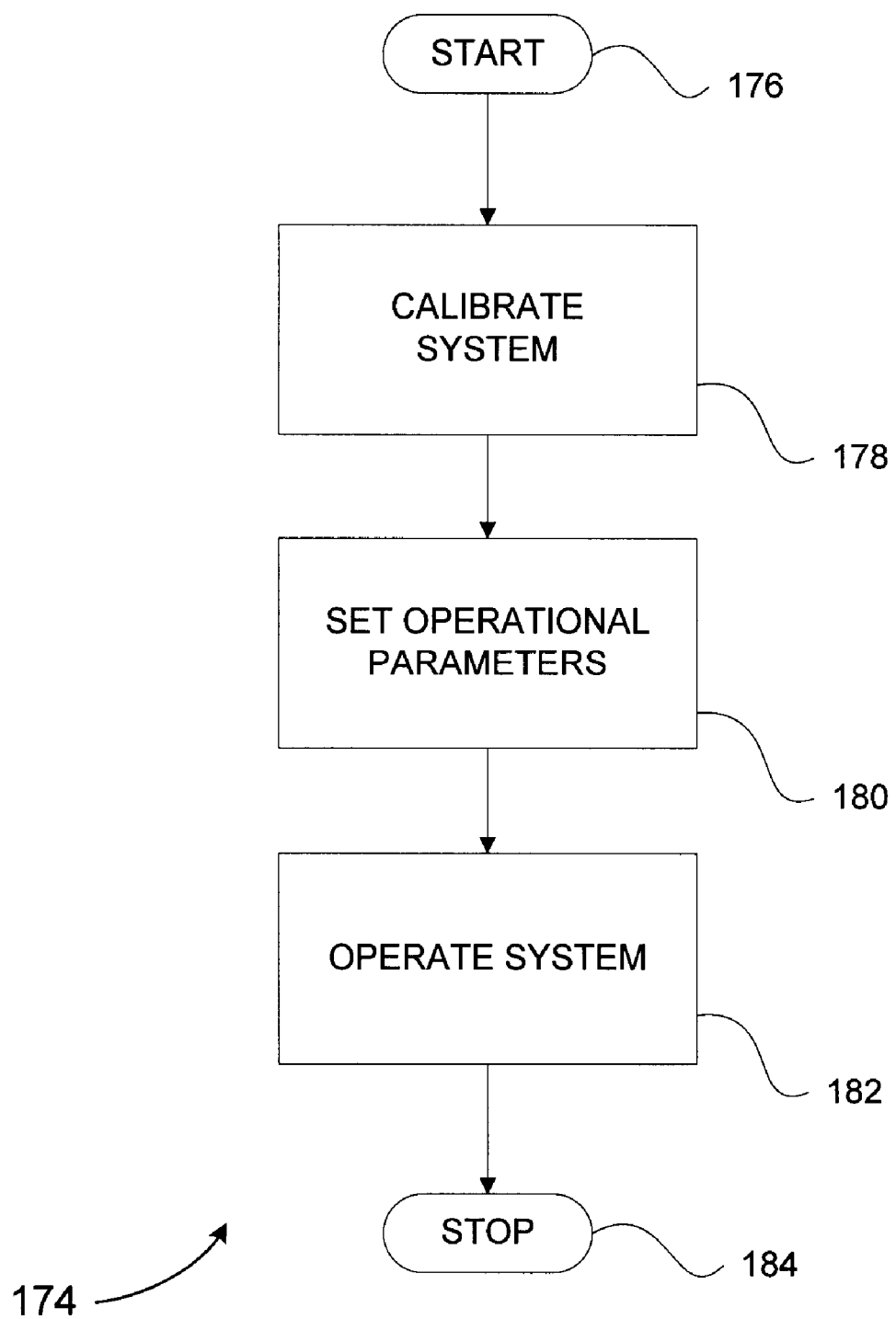
FIG. 4 is a flow chart depicting the preferred method of operation for the preferred embodiment of a thermal spraying system employing an arc control system according to the present invention.

Referring to FIG. 4, a preferred method of operation for the preferred embodiment of a thermal spraying system employing an arc control system according to the present invention begins at 176 and proceeds to step 178, wherein the system is calibrated to function optimally for a particular application as defined by the operators of the system. For example, a path, distance, rate, and number of repetitions of traversal are generally chosen that are appropriate for the given task. In the case of a thermal spraying system of the type disclosed in the Rice et al. patent, for example, a spray gun is inserted into open ends of a bore, wherein it inscribes a helical path across the inner surface of the bore. Particularly, a couple of strokes (repetitions) occur in an axial direction at a predetermined rate while the plasma gun deposits spray material while rotating about the axis of the bore. These types of particulars are determined and arranged in step 178, and in the present example include at least two traverse rates for the independently controlled axial and rotational components of the system traversal. Further, a feed rate of the wire is initially selected based on supplied power and properties of the thermal spray material (feed wire) such that a constant thermal energy is maintained, thereby ensuring an even deposition of the thermal spray material under particular operating conditions. These and further variables can be manually input by an operator and/or automatically sensed and/or calculated by the ECU 112 (see FIG. 1) and sensors. For example, an initial parameter may require human input, and ECU 112 can refine the variable. Specifically, a technician may input a desired coating thickness from which ECU 112 can determine desired system rate(s) and/or number of repetitions. Once the calibration has occurred, the method 174 may proceed to step 180.

At step 180, the operators of the system manually set operational parameters for the arc control system, and this step is preferably facilitated by on screen input capability with an arc control system implemented in software with appropriate computer hardware. For example, the operators may select maximum and minimum boundaries for the current and voltage levels, or these may be selected automatically based on parameters already manually entered or calculated by ECU 112. Receipt of power characteristic information indication levels outside of these boundaries results in system shutdown. Also, the operators may alternatively or additionally select boundaries that will issue a warning rather than system shutdown. Further, the operators may set boundaries that determine the behavior of the arc control system relating to feed rate modification. For example, maximum and minimum boundaries for current information may be set based on a uniform current level determined in step 178, such that receipt of current information below the boundary triggers an increase in feed rate and vice versa. Alternatively, an initial and/or calibrated current level may be used by the arc control system as both the high and low bound, such that deviation in current from this predetermined level results in appropriate response. As a further alternative, current and voltage information could be used to calculate thermal energy in real time during system operation, such that a thermal energy bound may be appropriate. Thus, many types of operational parameters may be determined in step 180, and the method 174 proceeds to step 182 following selection of appropriate operational parameters.

At step 182, the thermal spraying system is operated according to the calibration performed in step 178, and the arc control system compensates for variability in operating conditions according to the operational parameters set in step 180. Preferably, the arc control system is implemented in software with appropriate computer hardware, such that operating conditions may be monitored on screen. Further, maintenance conditions are preferably diagnosed by the system and communicated to operators on screen. Also, if the system does not correct as anticipated, such as with a failure of the current to rise satisfactorily in response to attempts by the arc control system to increase the feed rate, a message may be communicated to an operator indicating possible slippage of drive rollers and/or drag on the feed wire. Following operation of the thermal spraying system at step 182, method 174 ends at 184.

Figure 5:
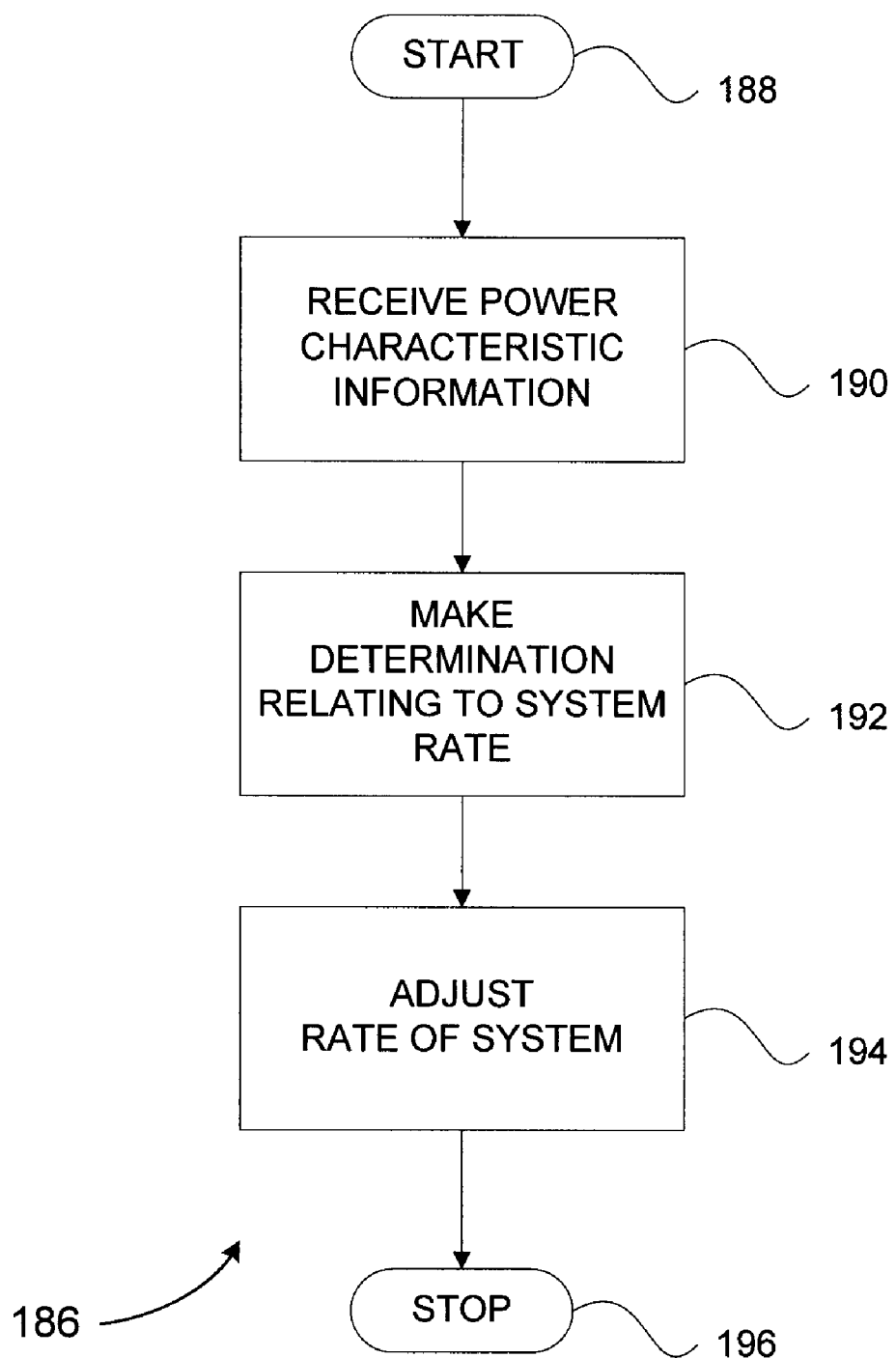
FIG. 5 is a flow chart diagram of the preferred method of operation for the preferred embodiment of an arc control system according to the present invention.

Referring to FIG. 5, a preferred method of operation 186 for the preferred embodiment of an arc control system according to the present invention begins at 188 and proceeds to step 190, wherein power characteristic information is automatically received. The received information relates to current and/or voltage of the DC power supplied to the plasma gun, and may take the form of a reading from a sensor, a reference signal from the DC power source, a bit value calculated to represent a difference between two readings or a signal reading over time (in other words, rate of voltage change or current change), and/or any one of many additional or alternative representations of information relating to power characteristics. In addition, further information may be received at step 190, such as information relating to a rate of the thermal spraying system. In particular, the feed rate(s) and traverse rate(s) of the system may further prove useful, and may be obtained via various sensors. With the power characteristic information received, the method 186 proceeds to step 192.

At step 192, a determination is made relating to a rate of the system, wherein the determination is based on the power characteristic information received in step 190 (feed rate and traverse rate(s) information may optionally and additionally be used). This determination is preferably performed automatically, in real time, on board ECU 112 (see FIG. 1). Deterministic rules for step 192 vary depending on the system and/or application of thermal spraying. For example, the rules vary depending on whether a constant voltage DC power supply or constant current DC power supply is used. Specifically, with a constant voltage power supply, then if the current information indicates that the current level is too low in the circuit to the spray gun, then the determination may correspond to a need to increase the wire feed rate to increase the current level and vice versa. Alternatively, if the voltage information indicates that the voltage level is too high in a circuit between a constant current DC power supply and the spray gun, then the determination may correspond to a need to increase the wire feed rate to decrease the voltage level and vice versa. Also, if current is too low with a constant voltage DC power supply, or if voltage is too high with a constant current DC power supply, then the determination may correspond to shutting the system down. Further, if thermal energy increases or deceases, and the wire feed rate is adjusted to compensate for the change in energy level, the determination may alternatively or additionally correspond to increasing or decreasing the traverse rate. In such a case, if more than one rate component is involved, then additional determinations may need to be made. Following making of a determination at step 192, method 186 proceeds to step 194.

At step 194, system rate(s) are automatically adjusted based on the determinations made in step 192. For example, if the determination was made to decrease wire feed rate, then the wire feed rate is decreased in a closed loop, real time manner. Traverse rates may also be adjusted in a closed loop, real time manner. The adjustment(s) called for may correspond to shutting down the system, such as when a power characteristic limit is exceeded that warrants system shutdown. In this case, adjusting the system rate may correspond to shutting off power to the spray gun, the wire feed servo motor, the system as a whole, and/or other subcomponents of the system. The adjustment may also occur at an instantaneous rate determined in step 192. Further, a difference between an ideal power characteristic and a measured power characteristic may map directly to a power signal sent to a servo motor, and this mapping mechanism may be adjusted based on a difference between an expected rate and a measured rate. In general, servo controlling a motor is a preferred method, and feedback from rate sensors may,be used in step 194 to monitor and optionally regulate the attempt to adjust the system rate. Feedback from rate sensors may also be used independently to adjust a system rate. In general, steps 190 through 194 are performed recursively until the task is completed, until functionality is interrupted by an operator or automated fault detection system, or until a power characteristic limit is exceeded that warrants system shutdown. In such instances, the method 186 ends at 196.

Figure 6:
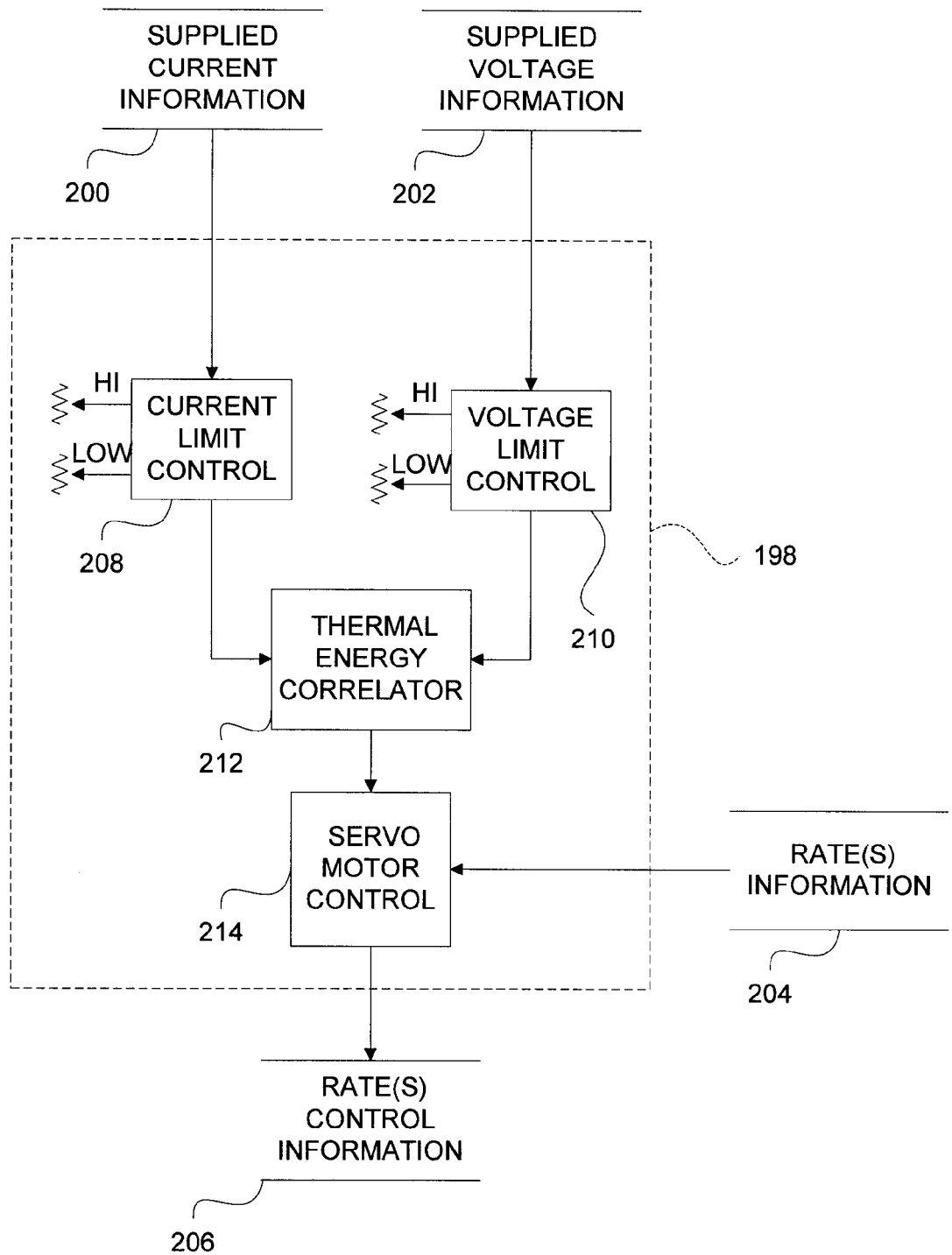
FIG. 6 is an electrical control block diagram for the preferred embodiment of the arc control system according to the present invention.

Referring to FIG. 6, an electrical control block diagram for the preferred embodiment of the arc control system according to the present invention is shown. Therein, control module 198 performs substantially according to the functionality of control modules 156A (see FIG. 2) and/or 156B (FIG. 3). Hence, power characteristic information is received in the forms of supplied current information 200 and supplied voltage information 202. Rate information 204 is also received, and rate control information 206 is produced. The information received and produced may take the form of electrical signals processed in the analog domain, and/or digitally stored information converted to and from electrical signals as needed. The rate control information 206, for example is converted, if necessary, to an electrical control signal and communicated to a servo motor to affect control of the servo motor at the specified rate. For contrast, the rate control information 206 may correspond to a bit value representing a desired change in a current rate of operation of a servo motor, and be used to adjust an electrical control signal being communicated to the servo motor. Typically, two servo motors per spray gun will be used, one for traverse rate and one for wire feed rate. Rate information 204 will typically have two components corresponding to the actual, measured rates of these servo motors, and rate control information 206 thus has two corresponding components for affecting control of the two servo motors according to the present invention.

Supplied current information 200 is communicated to current limit control block 208, wherein the current level is compared to maximum and minimum current limits to determine if the system needs to be shut down. Similarly, supplied voltage information 202 is communicated from point of reception to voltage limit control block 210, wherein the voltage level is compared to high and low voltage levels to determine if the system needs to be shut down. In the event that both signals are within the specified limits, the signals are communicated to thermal energy control block 212, wherein a thermal energy signal is produced that indicates the thermal energy level of the system. This thermal energy signal is therefrom communicated to servo motor(s) control block 214, wherein rate(s) information 204 is optionally received. Rate(s) information corresponds to measured wire feed rate(s) to one or more spray guns and/or measured spray gun traverse rate(s) of one or more spray guns. Servo motor(s) control block 214 generates at least one control signal for controlling at least one servo motor of the system at one or more rates determined based on the thermal energy signal and, optionally, the rate(s) information. One or more of these control signals corresponds to the rate(s) control information 206, and they preferably control servo motors feeding wire to the spray guns and/or servo motors affecting movement of the spray guns. Further electrical control block diagrams for implementing further embodiments of the arc control system of the present invention will be readily apparent to those skilled in the art given the disclosure contained herein.

Figure 7:
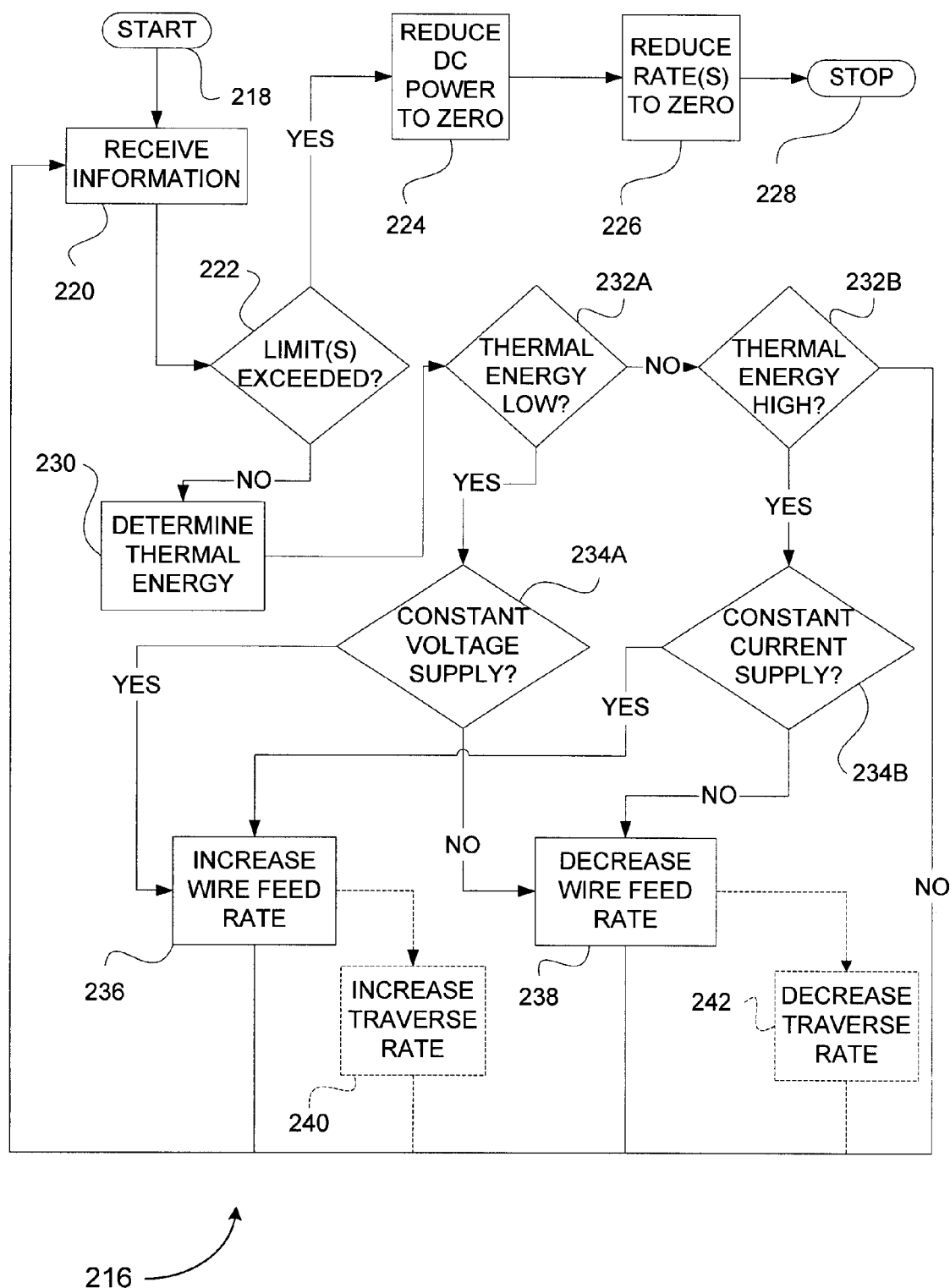
FIG. 7 is a logic flow diagram for the preferred embodiment of an arc control method according to the present invention.

FIG. 7 shows a logic flow diagram depicting a preferred embodiment of an arc control method 216 according to the present invention. Method 216 is a process of arc control for use with a single spray gun, but can be performed separately and/or in parallel for multiple spray guns. Method 216 begins at 218 and proceeds to step 220, wherein power characteristic information and, optionally, rate(s) information is received. If the method 216 is used with a constant voltage DC power supply, then power characteristic information received at step 220 corresponds at a minimum to supplied current information 200 (see FIG. 6). It is necessary to receive at least the supplied current information at step 220 with a constant voltage DC power supply because arc length is primarily an inverse function of supplied current level with a constant voltage DC power supply. Thus, the supplied current information 200 (see FIG. 6) provides essential information about the position of the end of feed wire 136 (see FIG. 2) relative to the non-consumable electrode corresponding to cathode 132 (see FIG. 2) with a constant voltage DC power supply. In contrast, if the method 216 is used with a constant current DC power supply, then power characteristic information received at step 220 corresponds at a minimum to supplied voltage information 202 (see FIG. 6). It is necessary to receive at least the supplied voltage information 202 at step 220 with a constant voltage DC power supply because arc length is primarily an inverse function of supplied voltage level with a constant current DC power supply. Thus, the supplied voltage information 200 (see FIG. 6) provides essential information about the position of the end of feed wire 136 (see FIG. 2) relative to the non-consumable electrode corresponding to cathode 132 (see FIG. 2) with a constant current DC power supply. Preferably, however, supplied voltage information 202 and supplied current information 200 (See FIG. 6) are both received at step 220 so that a thermal energy may be accurately calculated. Therefrom, if one of the power characteristic limits is exceeded as at 222, the DC power supply is shut down at step 224 to prevent damage to the spray gun and rates of the system are substantially reduced to zero at step 226. The method 216 ends at step 226. Thus, where a constant voltage power supply is used, a method of preventing damage to a spray gun due to a burn back condition is disclosed, wherein the method corresponds to receiving supplied current level information at step 220, detecting a drop in supplied current level below a predetermined threshold at 222, shutting off power to the spray gun at step 224, and stopping the wire feed servo motor at step 226.

If the power characteristic limits are not exceeded as at 222, however, the method 216 proceeds to step 230, wherein a thermal energy is calculated in one of many ways. For example, if voltage and current are actively monitored and/or referenced, such that supplied voltage information and supplied current information are both received at step 220, then thermal energy may be calculated as the product of the supplied voltage level and supplied current level. If, however, a constant voltage power supply is used and supplied current information, but not supplied voltage information, is received at step 220, then a constant voltage level may be assumed and the thermal energy level calculated as the product of the supplied current level and the assumed voltage level. Similarly, if a constant current power supply is used and supplied voltage information, but not supplied current information, is received at step 220, then a constant current level may be assumed and the thermal energy level calculated as the product of the supplied voltage level and the assumed current level. It is also possible to factor one or more monitored rates of the system into the thermal energy calculation so as to adjust the calculation up or down in step 230.

Following step 230, determinations are made as to whether the thermal energy falls below a threshold defined as the lower end of an optimal range (in other words, on the low side) as at 232A, and/or whether the thermal energy rises above a threshold defined as the upper end of the optimal range (in other words, on the high side) as at 232B. Further processing of method 216 depends on whether a constant voltage DC power supply or a constant current DC power supply is being used as at 234A and 234 B (wherein a response of "NO" indicates use of the alternative power supply). For example, if the thermal energy is on the low side and a constant voltage DC power supply is being used, then method 216 proceeds to step 236, wherein the wire feed rate is increased, and it is preferable to use monitored wire feed rate information to adjust an increase in wire feed rate as appropriate. Also, if the thermal energy is on the high side and a constant current DC power supply is being used, then method 216 also proceeds to step 236, and it is preferable to use monitored wire feed rate information to adjust this increase as appropriate. It is appropriate to increase the wire feed rate in both of the aforementioned cases because each case can be equated with the feed wire having burned back to some degree. For example, with a constant voltage DC power supply, a decrease in thermal energy stemming primarily from a decrease in current means that the feedwire has receded from the non-consumable cathode, thus lengthening the arc. Similarly, with a constant current power supply, an increase in thermal energy stemming primarily from an increase in voltage means that the feed wire has receded from the non-consumable cathode, thus lengthening the arc.

The logic described above essentially reverses in the alternative cases where the meanings of sensed power characteristics are reversed. For example, with a constant current DC power supply, a decrease in thermal energy stemming primarily from a decrease in voltage means that the feedwire has approached the non-consumable cathode, thus shortening the arc. Also, with a constant voltage DC power supply, an increase in thermal energy stemming primarily from an increase in current means that the feed wire has approached the non-consumable cathode, thus shortening the arc. Thus, it is appropriate in these two cases for method 216 to proceed to step 238, where wire feed rate is decreased. It is preferable to use monitored wire feed rate information at step 238 to adjust the decrease in wire feed rate as appropriate.

Preferably, method 216 proceeds from step 236 to step 240, wherein the traverse rate is increased, and from step 238 to step 242, wherein the traverse rate is decreased. In other words, it is preferable to control traverse rate as a function of wire feed rate, since wire feed rate is determinative of deposition rate of thermal spray material. Thus, by adjusting traverse rate of a spray gun in response to changes in thermal spray material deposition rate, a more even deposition of thermal spray material on a workpiece surface is achieved. Notably, it is preferable to use monitored traverse rate information to increase or decrease this adjustment as appropriate. Of further note, it is also preferable to use monitored wire feed rate to increase or decrease this adjustment as appropriate. Once all rates of the spray gun in question have been adjusted, method 216 returns to step 220 for further processing and the method continues recursively until either limits are exceeded or a thermal spraying cycle is completed.

While various embodiments have been disclosed, it will be appreciated that other configurations may be employed within the spirit of the present invention. For example, the feed rate may be adjusted by a variable speed mechanical drive, a clutch mechanism, and/or a brake. Also, thermal spray material may take many forms that can be fed to a thermal spray gun by other means than drive rollers. For instance, powder fed to a gun from a vibrating hopper can be used. Thus, adjusting a feed rate may take many different forms depending on the feed material and method being employed, and forms for adjusting a traverse rate may similarly vary. Generally varying according to the circumstances, the adjustment may correspond to servo controlling a motor, applying a brake, adjusting a valve, adjusting a throttle, performing a power ramp, manipulating a clutch mechanism, and/or other ways of adjusting a rate that will be readily apparent to one skilled in the art given the preceding disclosure. Further, a traverse rate exists where a spray gun is stationary and a workpiece moves in relation to the spray gun. In this situation, the workpiece and traverse movement mechanisms should be understood to be part of the thermal spraying system, and the traverse rate thus described is a rate of the system. Moreover, it is envisioned that rack and pinion, cable driven or linkeage actuated movement mechanisms can be alternately provided to move the spray guns, and that a variety of alternately configured spray applicators, even without thermal guns, can be substituted for those disclosed, although all of the present advantages may not be achieved. Furthermore, the present invention can be used with other automotive or non-automotive workpieces. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermal spraying system comprising:
thermal spray material;
an electrical energy thermal spraying device operably atomizing and spraying said thermal spray material;
a power supply operable to supply electrical power to said spraying device;
a sensor operable to monitor at least one power characteristic of said supplied electrical power;
a feed rate control module operable to adjust a feed rate of said thermal spray material based on said monitored power characteristic; and
a movement rate control module operable to adjust a relative rate of movement between said spraying device and a workpiece receiving thermal spray material, wherein said relative rate of movement is adjusted based on said monitored power characteristic to improve evenness of deposition of said atomized and sprayed thermal spray material on said workpiece.

2. The system of claim 1, wherein said feed rate control module is operable to adjust the feed rate to maintain said monitored power characteristic at a substantially constant level.

3. The system of claim 1, wherein said power supply corresponds to a constant voltage DC power supply, and said power characteristic corresponds to supplied electrical current level.

4. The system of claim 1, wherein said power supply corresponds to a constant current DC power supply, and said power characteristic corresponds to supplied electric voltage.

5. The system of claim 1 further comprising a supplied power reference signal operable to provide information relating to a further power characteristic of said supplied electrical power.

6. The system of claim 5, wherein said feed rate control module operable to adjust the feed rate of said thermal spray material based on said further power characteristic.

7. The system of claim 1 further comprising:
a workpiece receiving atomized and sprayed thermal spray material on a surface of said workpiece; and
a movement rate control module operable to adjust a rate of movement of said spraying device relative to said workpiece based on said monitored power characteristic.

8. The system of claim 7, wherein said workpiece is an automotive vehicle component.

9. A system comprising:
a coating material;
a coating device operably applying said coating material;
a workpiece operably receiving said coating material;
a power supply operable to supply electrical power to said coating device;
a sensor operable to monitor a power characteristic of said supplied electrical power; and
a movement rate control module operable to adjust a rate of movement of said coating device relative to said workpiece based on said monitored power characteristic to improve evenness of deposition of said coating material on said workpiece.

10. The system of claim 9 further comprising a supplied power reference signal operable to provide information relating to a further power characteristic of said supplied electrical power.

11. The system of claim 10, wherein said movement rate control module is operable to adjust the rate of movement of said coating device relative to said workpiece based on said further power characteristic.

12. The system of claim 9, wherein said coating material is thermal spray material and said coating device is an electrical energy thermal spraying device.

13. A thermal spraying system comprising:
thermal spray material;
an electrical energy thermal spraying device operably atomizing and spraying said thermal spray material;
a substantially constant voltage DC power supply operable to supply electrical power to said spraying device;
a current sensor operable to monitor an electrical current level of said supplied electrical power; and
a power interruption module operable to shut off electrical power to said spraying device if said sensed electrical current level drops below a predetermined threshold in order to reduce damage to said spraying device that occurs in a burn back condition.

14. The system of claim 13 further comprising a feed rate control module operable to adjust a feed rate of said thermal spray material based on said sensed electrical current in order to maintain a substantially constant current level.

15. The system of claim 13 further comprising a supplied voltage reference signal operable to provide information relating to an electrical voltage level of said supplied electrical power.

16. The system of claim 15 further comprising a feed rate control module operable to adjust a feed rate of said thermal spray material based on said sensed electrical current level and said referenced electrical voltage level in order to maintain a substantially constant thermal energy.

17. The system of claim 15 further comprising a movement rate control module operable to adjust a rate of movement of said spraying device relative to a workpiece based on said sensed electrical current level and said voltage reference signal as a function of thermal energy in order to improve evenness of deposition of said atomized and sprayed thermal spray material on a surface of said workpiece.

18. The system of claim 13, wherein said thermal spray material corresponds to feedwire.

19. The system of claim 13, wherein said current sensor corresponds to a Hall effect sensor operably disposed inline with electrical power supplied to said spraying device.

20. A thermal spraying system comprising:
thermal spray material;
an electrical energy thermal spraying device operably atomizing and spraying said thermal spray material;
a power supply operable to supply electrical power to said spraying device;
a sensor operable to monitor a power characteristic of said supplied electrical power;
a feed rate control module operable to adjust a feed rate of said thermal spray material based on said sensed power characteristic in order to reduce damage to said spraying device that occurs in a burn back condition without shutting down said system; and
a movement rate control module operable to adjust a rate of movement of said spraying device based on said monitored power characteristic to improve evenness of deposition of thermal spray material.

21. The system of claim 20 further comprising a supplied power reference signal operable to provide information relating to a further power characteristic of said supplied electrical power, wherein said feed rate control module is further operable to adjust the feed rate based on said reference signal in order to reduce damage to said spraying device that occurs in a burn back condition without shutting down said system.

22. The system of claim 20, wherein said power supply corresponds to a constant voltage DC power supply, and said power characteristic corresponds to supplied electrical current level.

23. The system of claim 21, wherein said power supply corresponds to a constant current DC power supply, and said power characteristic corresponds to supplied electrical voltage level.

24. An arc control system for use with a spraying device operable to atomize and spray thermal spray material, the system comprising:
an input module receptive of power characteristic information relating to a power characteristic of electrical power supplied to said spraying device;
a feed rate control module operable to generate feed rate control information based on said power characteristic information, wherein said feed rate control information is calculated to adjust a feed rate of said thermal spray material; and
a movement rate control module operable to adjust a rate of movement of said spraying device based on said monitored power characteristic to improve evenness of deposition of thermal spray material.

25. The system of claim 24, wherein said feed rate control information is calculated to maintain said power characteristic at a substantially constant level.

26. The system of claim 24, wherein said electrical power is supplied by a constant voltage DC power supply, and said power characteristic information relates to supplied electrical current level.

27. The system of claim 24, wherein said electrical power is supplied by a constant current DC power supply, and said power characteristic information relates to supplied electric voltage.

28. The system of claim 24, wherein said input module is receptive of further power characteristic information relating to a further power characteristic of said electrical power supplied to said spraying device.

29. The system of claim 28, wherein said feed rate control module is operable to generate said feed rate control information based on said further power characteristic information.

30. An arc control system for use with a spraying device operable to atomize and spray thermal spray material, comprising:
an input module receptive of power characteristic information relating to a power characteristic of electrical power supplied to said spraying device; and
a movement rate control module operable to generate movement rate control information based on said power characteristic information, wherein said movement rate control information is calculated to adjust a rate of movement of said spraying device relative to a workpiece, thereby improving evenness of deposition of atomized and sprayed thermal spray material on a surface of said workpiece.

31. The system of claim 30, wherein said electrical power is supplied by a constant voltage DC power supply, and said power characteristic information relates to supplied electrical current level.

32. The system of claim 30, wherein said electrical power is supplied by a constant current DC power supply, and said power characteristic information relates to supplied electrical voltage level.

33. The system of claim 30, wherein said input module is receptive of further power characteristic information relating to a further power characteristic of said electrical power supplied to said spraying device, and said movement rate control module is further operable to generate said movement rate control information based on said further power characteristic information.

34. A method of performing arc control for use with a spraying device operable to atomize and spray thermal spray material, the method comprising:
receiving power characteristic information relating to a power characteristic of electrical power supplied to said spraying device;
generating feed rate control information based on said power characteristic information, wherein said feed rate control information is calculated to adjust a feed rate of said thermal spray material;
adjusting said feed rate based on said feed rate control information;
generating movement rate control information based on said power characteristic information, wherein said movement rate control information is calculated to adjust a relative rate of movement to improve a characteristic of deposition of the atomized and sprayed thermal spray material; and
adjusting said relative rate of movement based on said movement rate control information.

35. The method of claim 34, wherein said generating feed rate control information corresponds to calculating feed rate control information to adjust the feed rate to maintain said power characteristic at a substantially constant level.

36. The method of claim 34 comprising receiving further power characteristic information relating to a further power characteristic of said electrical power supplied to said spraying device.

37. The method of claim 36 further comprising generating said feed rate control information based on said further power characteristic information.

38. A method of controlling a spraying device operable to atomize and spray thermal spray material, comprising:
receiving power characteristic information relating to a power characteristic of electrical power supplied to said spraying device;
generating movement rate control information based on said power characteristic information, wherein said movement rate control information is calculated to adjust a rate of movement of said spraying device relative to a workpiece in order to improve evenness of deposition of atomized and sprayed thermal spray material on a surface of said workpiece; and
adjusting said rate of movement of said spraying device relative to said workpiece based on said rate control information.

39. The method of claim 38, wherein said workpiece corresponds to an automotive vehicle component.

40. The method of claim 38, wherein said electrical power is supplied by a constant voltage DC power supply, and said power characteristic information includes electrical current level.

41. The method of claim 36, wherein said electrical power is supplied by a constant current DC power supply, and said power characteristic information includes electrical voltage level.

* * * * *